United States Patent [19]

Nguyen

[11] Patent Number: 5,720,001
[45] Date of Patent: Feb. 17, 1998

[54] QUESTIONLESS CASE-BASED KNOWLEDGE BASE AND A METHOD FOR CONSTRUCTING THE SAME

[75] Inventor: Trung D. Nguyen, Tomball, Tex.

[73] Assignee: Compaq Computer Corporation, Houston, Tex.

[21] Appl. No.: 436,502

[22] Filed: May 8, 1995

Related U.S. Application Data

[63] Continuation of Ser. No. 48,880, Apr. 16, 1993, abandoned.

[51] Int. Cl.$^6$ ........................................... G06F 17/00
[52] U.S. Cl. ................................. 395/10; 395/50
[58] Field of Search ..................... 395/10, 50, 51, 395/60, 600; 364/419.19

[56] References Cited

U.S. PATENT DOCUMENTS

| | | | |
|---|---|---|---|
| 4,658,370 | 4/1987 | Erman et al. | 395/61 |
| 5,224,206 | 6/1993 | Simoudis | 395/51 |
| 5,333,237 | 7/1994 | Stefanopolous et al. | 395/50 |

OTHER PUBLICATIONS

Janet Kolodner, Chapter 5: Case-Based Reasoning, Representing Cases, 1993.
Phyllis Koton, Using a Case Memory to Integrate Case-Based and Casual Reasoning, Case-Based Reasoning Workshop, Aug. 23, 1988, pp. 74–81.
Acorn, T.L., & Walden, S.H., "SMART: Support Management Automated Reasoning Technology for Compaq Customer Service," Proceedings of the IAAI '92 Conference, San Jose, Jul. 1992.
Gordon, S.E., "Front-end analysis for expert system design," Proceedings of the Human Factors Society 35th Annual Meeting, San Francisco, Sep. 1991.
CBR Express Documentation, Chapter 5: Import/Export Utilities, available from Inference Corp., Jan. 1993.
Intelligent Systems Report, vol. 8(12), p. 18, Dec. 1991.
Release 1.0, "Case-based reasoning: a familiar story," vol. 92(1), 10 pages, Jan. 1992.
Esteem (V.1.3) Software Product Specification, Dec. 1992.
B. Arnold, "Expert system tools optimizing help desks; customer service moves center stage; Compaq builds Smart in response," software Magizine, vol. 13(1), p. 56 (6 pages), Jan. 1993.
L. O'Brien, "The Tao of Dow (Expert's ToolBox)," AI Expert, vol. 8(2), p. 19 (2 pages), Feb. 1993.
M. Liskin, dBASE III Plus Made Easy, Osborne McGraw-Hill, Chapter 13, pp. 365–381, Dec. 1988.
R.S. Freedman et al., "Expert systems in spreadsheets: modeling the Wall Street user domain," Proc. First Int'l. Conf. on Artificial Intelligence on Wall Street, pp. 296–301, Oct. 1991.

(List continued on next page.)

Primary Examiner—Robert W. Downs
Attorney, Agent, or Firm—Hickman, Beyer & Weaver, LLP

[57] ABSTRACT

A questionless case-based knowledge base suitable for access by an intelligent search engine and an associated method for constructing the same from pre-existing on-line documentation. A case structure for questionless cases is determined. The determined case structure includes a first field for containing a title for a case, a second field for containing a description of the case and a third field for containing a solution for the case. On-line documentation having information directed to a plurality of topics, each of which includes a title portion and a contents portion, is then provided. The information directed to each of the plurality of topics is then reconfigured into the determined case structure such that the title portion of each topic is configured as a first field of a corresponding case and the contents portion of each topic is configured as a second field of the corresponding case. A solution comprised of a path from the third field of the case to the second field of the case is then appended to each of the cases. The information reconfigured into questionless case structures are then combined to form a questionless case-based knowledge base.

13 Claims, 3 Drawing Sheets

OTHER PUBLICATIONS

H. Kitano et al., "Building Large-Scale and Corporate-Wide Case-Based Systems: Integration of Organizational and Machine Executable Algorithms," Proc. AAAI Conf., pp. 843–849, Jul 1992.

Shafer, "CBR Express, Getting Down to Cases", PCAI, Jul/Aug. 1991 pp. 42–45.

Keen, "Case Bases for Help Desks", IEE Colloq on Case Based Reasoning, Dec. 12, 1993, pp. 8/1–8/25.

Oehlmann, "Case Based Planning in an Exploratory Discovery System", IEE Colloq on Case Based Reasoning, Feb. 12, 1993, pp. 1/1–1/3.

Broverman et al, "Case Based Hypermedia Access of Lessons Learned to Accomplish, Technology Transfer", IEEE/Semi Advanced Semi-Conductor mfg conf & Workshop, Sep. 30–Oct. 1 1992, pp. 194–196.

Ashley et al, "A Case–Based Approach to modeling Legal Expertise", IEEE Expert, vol. 3 Iss 3 pp. 70–77, Fall 1988.

QUESTIONLESS CASE-BASED KNOWLEDGE BASE AND A METHOD FOR CONSTRUCTING THE SAME

CROSS REFERENCE TO RELATED APPLICATION

This is a continuation of application Ser. No. 08/048,880, filed Apr. 16, 1993, now abandoned.

This application is also related to co-pending U.S. patent application Ser. No. 08/048,879, filed on even date herewith, assigned to the Assignee of the present application, and hereby incorporated by reference as if reproduced in its entirety.

BACKGROUND OF THE INVENTION

1. Field of the Invention

The present invention generally relates to a questionless case-based knowledge base accessible by an intelligent search engine and a method for constructing the same from pre-existing on-line documentation.

2. Description of Related Art

Expert systems are comprised of two parts, a knowledge base and an engine. Traditionally, the engine has either been a reasoning or inference engine which embodies a problem-solving method or procedure and uses the knowledge in the knowledge base to construct a line of reasoning which leads to a solution for the problem. The most common line of reasoning used by an expert system involves the chaining, either forward, backward or a flexible mix thereof, of IF-THEN rules. However, as knowledge of the domain for a particular problem is almost always incomplete and, has, therefore, a degree of uncertainty in the solution thereof, a rule may have associated therewith, a confidence factor ("CF") or weight. Alternately, using "fuzzy logic", the degree of uncertainty associated with a rule may be represented by a distribution of values. Using the CFs or uncertainty distribution, the inference engine is able to evaluate various lines of reasoning and provide probabilities of correctness for the various lines of reasoning.

Typically, the knowledge base of an expert system is organized in a specific representational form for use by the inference engine. One such system, generally referred to as a rule-based system, arranges knowledge as a series of rules, each consisting of an IF part and a THEN part. The IF part lists a set of conditions in some logical combination. The piece of knowledge represented by the rule is relevant to the line of reasoning being developed if the IF part of the rule is satisfied. Consequently, the THEN part can then be concluded, or its action taken.

A related representational form of a knowledge base which is more suitable for use in complex systems is generally referred to as a "case-based" knowledge base. In this format, knowledge is arranged as a series of discrete record entities commonly known as cases. Generally, a knowledge base would be provided with a case for each problem to be addressed by the associated expert system. Each case is structured to include a title, a description field, a list of questions and answers, and a solution. Various case-based systems which are similar to the system described above and which are presently commercially available include CBR Express and CasePoint, both of which are manufactured by Inference Corporation of El Segundo, Calif.

When executing an operation, for example, determining a solution to a problem, using a case-based reasoning system, the user of the system is required to type in a natural language description of a symptom of the problem. Using the symptom provided by the user, the engine scans all of the questions residing in the knowledge base and returns with a list of questions to be answered by the user. Based upon the answers to the proffered questions, the engine narrows the search to a solution set forth in one of the cases.

Expert systems which utilize case-based knowledge bases have several shortcomings, particularly with respect to the question/answer list. In order to function properly, the question/answer list must be carefully crafted such that, based upon the answers to the questions, the engine is led to the correct solution. As a result, formation of the question/answer portion of a case-based knowledge base is a critical element of the case building process which is very manpower intensive and often requires on the order of 70-80% of the total time required to build the knowledge base for an expert system. Due to the demands required to build such a knowledge base, there is often insufficient manpower to fully test and fine-tune the expert system.

Another problem with expert systems which incorporate a case-based knowledge base is that such systems have been traditionally used in the so-called "help-desk" environment where the actual user of the device would verbally describe the symptoms over the phone to a trained technician at a remote location. The technician would then relay the questions generated by the expert system to the user. As the technician was much more familiar with both the expert system and the knowledge base, unclear or difficult questions could be explained to users with relatively little experience with the expert system. If, however, the expert system were installed in the user's computer system, it is entirely possible that the user would be unable to fully understand the questions. Such questions, if improperly answered, could potentially impede the expert system from being able to properly diagnose a problem.

While it would be desirable to make such automated expert systems broadly available, the cost and "ease of use" problem presented by the expert system's use of the question/answer list remain serious impediments to acceptance of such systems by the general public. Due to these shortcomings, computer users have traditionally relied upon either the "help-desk" or upon operating manuals published by the manufacturer for assistance when faced with an operating problem.

With the advent of CD-ROM, computer users have become increasingly comfortable with the concept of reviewing documents on-line. Accordingly, on-line documentation has become increasingly available in recent years and has been most popular with those computer users who prefer avoiding having to continuously reference printed publications. In the near future, it is anticipated that many computer users will expect that on-line documentation accompany all of their hardware or software purchases. Furthermore, as the additional costs involved in making printed materials available on-line are minimal, the computer industry will likely satisfy this demand without hesitation.

With the increasing availability of on-line documentation, it can be readily seen that it would be desirable to be able to modify such documentation to provide a questionless case-based knowledge base suitable for use with a system which incorporates an intelligent search engine and which will provide the user with a solution to a problem without requiring the user to correctly answer a series of questions generated by the system. Accordingly, it is an object of this invention to provide such a technique.

SUMMARY OF THE INVENTION

In one embodiment, the present invention is of a questionless case-based knowledge base which is accessible by an intelligent search engine. The questionless case-based knowledge base is comprised of a plurality of questionless case structures stored in memory. Each of the case structure includes first, second and third fields. The first field contains a topic, the second field contains a description of the topic named in the first field and the third field contains an action. The action may be either a solution to a problem or a path to a topic. In one aspect of the invention, the solution is a path to a description of the problem which, in a further aspect of the invention, is contained in the second field of the case structure. In another aspect of the invention, the action is a path to a description of the topic. In a further aspect of the invention, the title of the topic is contained in the first field of the case structure and the contents of the topic is contained in the second field of the case structure.

In another embodiment, the present invention is of a method for constructing a questionless case-based knowledge base suitable for access by an intelligent search engine from pre-existing on-line documentation. First, on-line documentation containing information directed to a plurality of topics is provided. The provided on-line documentation directed to each of the plurality of topics is then reconfigured into a corresponding questionless case for the questionless case-based knowledge base. In one aspect of the invention, each of the topics contained in the provided on-line documentation includes a title portion and a contents portion. The information contained in the title portion of each topic is transferred into a first field of the corresponding questionless case and the information contained in the contents portion of each topic is transferred into a second field of the corresponding questionless case. In another aspect of the invention, a third field is then provided for each of the produced questionless cases. In a further aspect of the invention, the third field of each of the produced questionless cases is a path to the second field of that case.

In yet another embodiment, the present invention is of a method for constructing a questionless case-based knowledge base suitable for access by an intelligent search engine from pre-existing on-line documentation. First, a case structure for questionless cases is determined. On-line documentation having information directed to a plurality of topics is then provided. The information directed to each of the plurality of topics is reconfigured into the determined case structure and the information reconfigured into the determined case structures are combined to form a questionless case-based knowledge base. In one aspect of this invention, the determined case structure for questionless cases provides a first field for containing a title for a case, a second field for containing a description of the case and a third field for containing a solution for the case. In another aspect of the invention, the provided on-line documentation is comprised of a plurality of topics, each of which includes a title portion and a contents portion and, in a further aspect of the invention, the title portion of each topic is configured as a first field of a corresponding case and the contents portion of each topic is configured as a second field of the corresponding case. A solution may then be appended to each of the plurality of cases. The appended solution for each case may be a path from the third field to the second field of that case.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1:
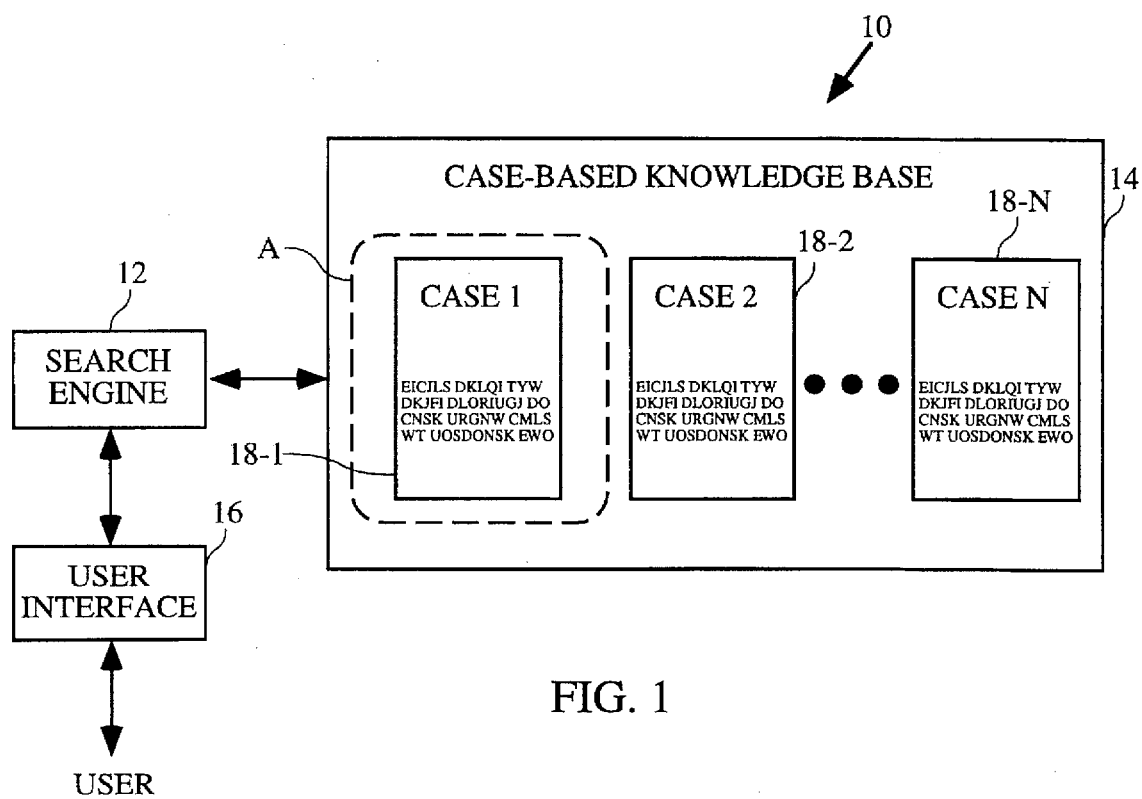
FIG. 1 is a block diagram of an system for accessing on-line documentation constructed in accordance with the teachings of the present invention and incorporating therein an intelligent search engine and an associated questionless case-based knowledge base.

Referring first to FIG. 1, a system 10 suitable for accessing on-line documentation in accordance with the teachings of the present invention will now be described in detail. As disclosed herein, the system 10 is suitable for various purposes which include the diagnosis of devices and/or systems, for example, a network printer, to provide a solution to an operating problem detected by a user of the network printer or other device or system. It is further contemplated that the system 10 is equally suitable for use as a tool for accessing a specific topic or topics within a database or other on-line documentation.

The system 10 includes a processor-based intelligent search engine 12, which, for example, may be designed as an application suitable for use with the Microsoft Windows graphical user interface manufactured by Microsoft Corporation of Redmond, Wash., and an associated knowledge base 14 stored in memory. In response to the input, by the user of the device or system, of a natural language description of a problem to be solved or a topic to be located, via user interface 16, for example, a computer keyboard or other conventional user interface, the search engine 12 performs a search of the knowledge base 14 and identifies an "action" or "solution" in response thereto. For example, if the system 10 is used to diagnose an operating problem observed by the user, the search engine 12 will search the knowledge base 14 to locate either a procedure to solve the operating problem or a location within the knowledge base 14 where additional information on the operating problem is located. Alternately, if the system 10 is used to locate a topic within the knowledge base 14, the search engine 12 will search the knowledge base 14 and provide a location within the knowledge base 14 where the topic is located.

The knowledge base 14 is configured as a case-based knowledge base. By "case-based", it is intended to refer to a knowledge base 14 comprised of a series of discrete cases 18-1, 18-2, 18-N, each relating to a separate topic within the field to which the knowledge base 14 is directed, stored in memory. For example, if the knowledge base 14 is configured to diagnose problems within a network printer, cases 18-1 through 18-N would each contain a description of and a solution to a problem commonly occurring in network printers. Alternately, if the knowledge base 14 is directed to providing access to on-line documentation regarding a field of knowledge, cases 18-1 through 18-N would each contain a description of a topic commonly associated with that field of knowledge.

It is contemplated that, in one aspect of the invention, the intelligent search engine 12 and associated questionless case-based knowledge base 14 may be manufactured from the processor based inference engine and associated knowledge base of an existing expert system, for example, CBR Express. To do so, the provided knowledge base should first be reconfigured such that all question/answer lists are removed from the pre-existing case structures, thereby converting the knowledge base into a questionless case-based knowledge base. As the question/answer list provides the inference engine with a series of rules with which the inference engine arrives at a solution based upon the answers to a series of questions, absent the question/answer list, strictly speaking, the expert system may no longer be viewed as such. The utility program which permitted the processor to arrive at a solution based upon the answers to series of questions may then be disabled, thereby leaving the processor's searching capabilities as the primary function of the utility program. In this manner, the inference engine is effectively converted into a search engine. Furthermore, when operated in accordance with the procedure to be more fully set forth below, the search engine will be able to determine a solution to a problem based upon the results of a series of searches, thereby producing a search engine which may be considered an "intelligent" search engine.

Figure 2:
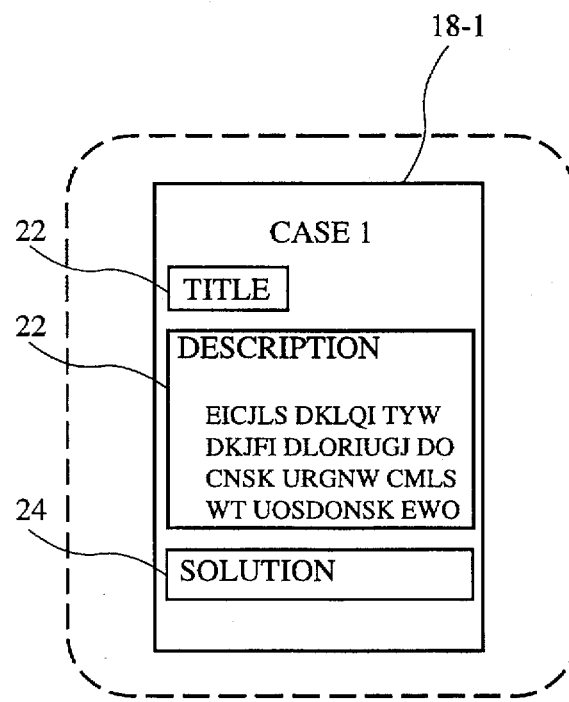
FIG. 2 is an expanded block diagram of Detail A of FIG. 1 and illustrating the structure of a questionless case of the questionless case-based knowledge base of FIG. 1.

Referring next to FIG. 2, the structure of a case 18 will now be described in greater detail. Specifically, each case 18 is comprised of three parts: a first (or "title") field 20 used to identify the topic to which the case 18 is directed, a second (or "description") field 22 which contains the information which describes the topic to which the case 18 is directed and a third (or "solution") field 24, also referred to as the action field. Under certain circumstances, most commonly when the system 10 is used to provide a solution to a problem, the solution field 24 may contain an explicit instruction which, if followed, will correct the problem of concern. In most circumstances, however, the solution field 24 will identify where the information contained in the description field 22 of the case 18 is located and provide a path to that information for the user. For example, by clicking on the solution field 24, the user is transferred to the description field 22. This type of solution will be appropriate where the solution to the problem requires a detailed explanation thereof or where the system is being used to locate a topic within on-line documentation. Further details regarding the method of accessing topics or solving problems using the system 10 are set forth in co-pending U.S. patent application Ser. No. 08/048,879.

Figure 3:
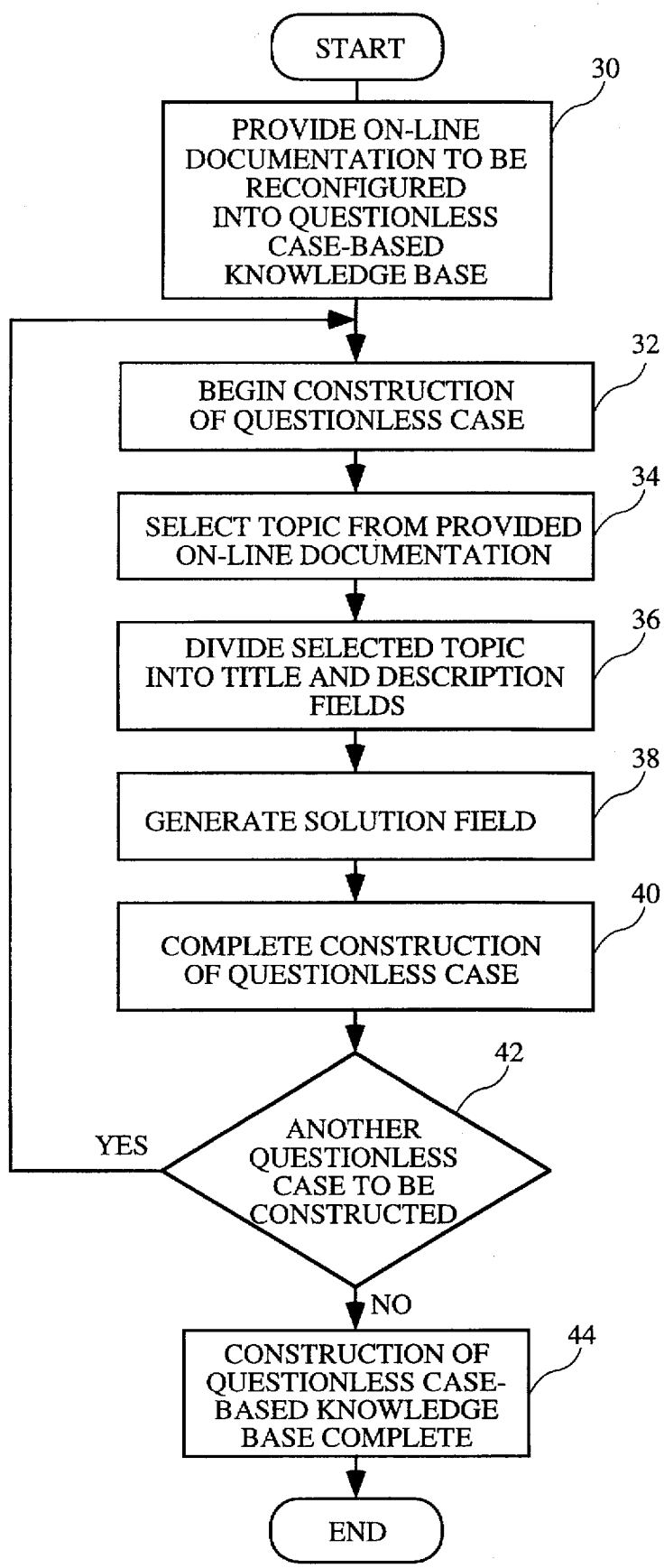
FIG. 3 is a flow chart illustrating a method for constructing the questionless case-based knowledge base of FIGS. 1 and 2 using pre-existing on-line documentation.

Referring next to FIG. 3, a method for constructing a questionless case-based knowledge base 14 suitable for use with the system 10 will now be described in greater detail. The method commences at step 30 where the user is provided with pre-existing on-line documentation related to the subject for which the questionless case-based knowledge base 14 is to be directed. For example, if the questionless case-based knowledge base 14 is to be directed to solving problems or accessing topics related to a network printer, a pre-existing on-line version of the user manual for the network printer would be suitable for use herein. Typically, on-line documentation such as that described herein is comprised of a series of topics, each of which includes a title portion which identifies the topic followed by a contents portion which describes the identified topic. Reconfiguring the provided on-line documentation arranged in the manner described herein into a questionless case-based knowledge base may be accomplished using a utility program configured to perform the procedure set forth in greater detail below.

Figure 4:
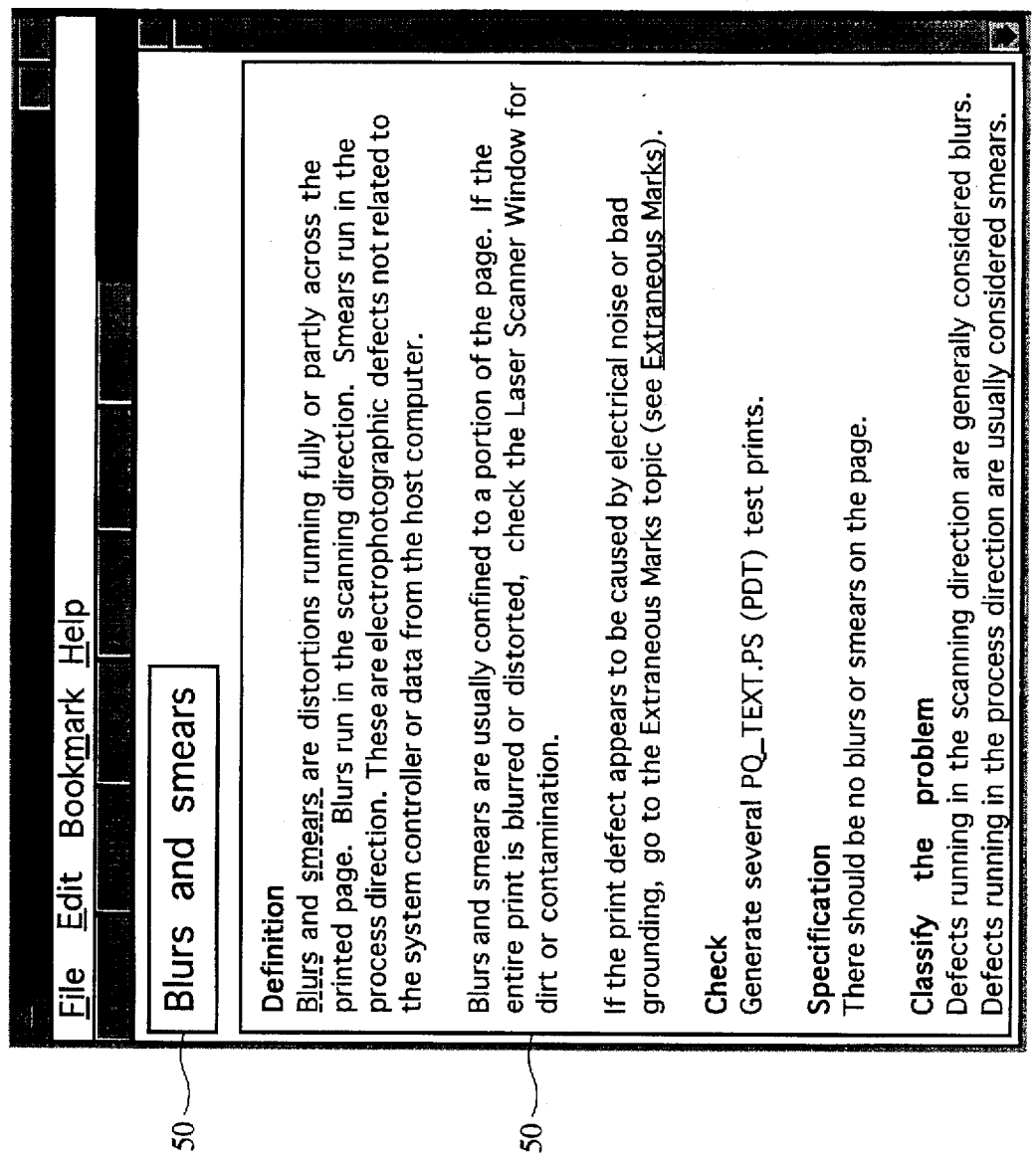
FIG. 4 illustrates an example of on-line documentation suitable for conversion into a questionless case-based knowledge base.

Proceeding to step 32, construction of a first questionless case 18 for the questionless case-based knowledge base 14 begins. At step 34, the utility program selects a first unconverted topic from the provided on-line documentation for conversion into a questionless case 18. For example, a portion of a topic 48 entitled "Blurs and Smears" which is visible on a computer screen and accessible using the Microsoft Windows graphical user interface may be seen in FIG. 4. The topic 48 is one part of a much larger body of on-line documentation directed to a network printer which is provided to the user as an on-line operating manual.

Continuing to step 36, the utility program then subdivides the selected topic 48 into the various components of a case 18 in accordance with the case structure previously set forth. More specifically, a title portion 50 of the selected topic 48 is designated as a title field 20 for a case 18. Accordingly, the created title field 20 would contain the entry "Blurs and Smears". Next, a contents portion 52 of the topic 48 would be designated as a description field 22 for the case 18 being constructed.

Proceeding to step 38, the utility program then generates a solution or action field 24 for the case 18 under construction. For example, for the case 18 having the title field "Blurs and Smears", a suitable solution would be "Procedure to resolve Blurs and Smears". It is specifically contemplated that the solution field 24 may be automatically generated by the utility program, for example, by appending a preselected term such as "Procedure to resolve" in front of the contents of the title field 20 of the case 18 under construction. Alternately, the utility program may ask the operator to select a solution for the case under construction. As previously stated, for most cases, the solution field 24 for the case 18 will identify where the information contained in the description field 22 for the case 18 is located and provide a path to that information, for example, by clicking on the solution field 24.

Continuing on to step 40, the construction of the questionless case 18 would then be completed and, at step 42, the construction of the questionless case-based knowledge base 14 continues by the utility program determining whether there are any additional topics contained in the provided on-line documentation which have yet to be converted into questionless cases 18. If there are any remaining topics to be converted into questionless cases, the method of the present invention returns to step 32 to begin construction of a next questionless case for the case-based knowledge base 14 in the manner previously described. If, however, it is determined at step 42 that all of the topics provided in the on-line documentation have been converted into questionless cases, the method proceeds to step 44 where it is determined that the construction of the questionless case-based knowledge base 14 is complete.

Thus, there has been described and illustrated herein, a questionless case-based knowledge base suitable for a system which utilizes an intelligent search engine to search the knowledge base for the solution to a problem or the location of a topic and a method of constructing the same. By constructing the knowledge base from pre-existing on-line documentation in the manner described herein, a significant reduction in the manpower required to construct such a knowledge base is achieved. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method for constructing, from pre-existing on-line documentation, a questionless case-based knowledge base suitable for access by an intelligent search engine, comprising the steps of:

determining a case for questionless cases;

receiving on-line documentation having a plurality of computer related topics, each comprised of a title portion and a contents portion;

reconfiguring said received on-line documentation into said questionless case-based knowledge base by transferring said title portion of each of said computer related topics into a first field of a corresponding questionless case and transferring said contents portion of each of said computer related topics into a second field of said corresponding questionless case; and forming a third field for each of said produced questionless cases, said forming operates to at least form, for each of said questionless cases, a path to said second field of said questionless case.

2. A method for constructing, from pre-existing on-line documentation, a questionless case-based knowledge base, said questionless case-based knowledge base comprised of a plurality of questionless cases and suitable for access by an intelligent search engine, comprising the steps of:

determining a case structure for questionless cases, said determining of the case structure for questionless cases includes forming a first field for containing a title for a case, forming a second field for containing a description of said case, and forming a third field for containing a solution for said case;

transmitting on-line documentation comprised of a plurality of topics, each said topic having a title portion and a contents portion, to said intelligent search engine; and reconfiguring said transmitted on-line documentation into a questionless case-base knowledge base comprised of a plurality of cases by reconfiguring each of said plurality of topics into said determined case structure for questionless cases and combining said plurality of topics respectively reconfigured into said determined case structure for questionless cases into said questionless case-based knowledge base.

3. A method for constructing a questionless case-based knowledge base according to claim 2 wherein the step of forming a third field containing a solution for said case further comprises the step of forming a path to said second field for said case.

4. A method for constructing a questionless case-based knowledge base according to claim 2 wherein the step of reconfiguring said transmitted on-line documentation into a questionless case-base knowledge base comprised of a plurality of questionless cases further comprises the steps of:

configuring said title portion of each of said topics as a first field of a corresponding questionless case configured in said determined case structure; and configuring said contents portion of each of said topics as a second field of said corresponding questionless case configured in said determined cases structure.

5. A method for constructing a questionless case-based knowledge base according to claim 4 and further comprising the step of appending a solution to each of said plurality of questionless cases.

6. A method for constructing a questionless case-based knowledge base according to claim 5 wherein the step of appending a solution to each of said questionless cases further comprises the step of forming a path from said third field to said second field for each of said questionless cases.

7. A method for constructing, from pre-existing on-line documentation, a questionless case-based knowledge base accessible by an intelligent search engine in a computer, comprising the steps of:

transmitting, to said intelligent search engine, on-line documentation having information directed to a plurality of computer related topics, each of said computer related topics having a subject matter to which the computer related topic is directed, a title portion that identifies said subject matter of each of said computer related topics and a contents portion for describing said subject matter of each of said computer related topics; and reconfiguring said title portion and said contents portion of said information into a corresponding questionless case for said questionless case-based knowledge by transferring said title portion of each of said computer related topics into a first field of said corresponding questionless case, and transferring said contents portion of each of said computer related topics into a second field of said corresponding questionless case; and forming a third field for each of said questionless cases, said forming operates to at least form a path to said second field of said questionless case.

8. A method for constructing, from pre-existing on-line documentation, a questionless case-based knowledge base suitable for access by an intelligent search engine, comprising the steps of:

determining a case structure for questionless cases, said determining of the case structure for questionless cases includes forming a first field for containing a title for a case, forming a second field for containing a description of said case, and forming a third field for containing a solution for said case;

transmitting, to said intelligent search engine, on-line documentation having information directed to a plurality of computer related topics, each of said computer related topics having subject matter to which the computer related topic is directed, a title portion that identifies said subject matter of each of said computer related topics and a contents portion for describing said subject matter of each of said computer related topics;

reconfiguring said title portion and said contents portion of said information directed to each of said computer related topics into said determined case structure for questionless cases; and combining said reconfigured information into said determined case structure for questionless cases into a questionless case-based knowledge base.

9. A method for constructing a questionless case-based knowledge base according to claim 8 wherein the step of forming a third field containing a solution for said case further comprises the step of forming a path to said second field for said case.

10. A method for constructing a questionless case-based knowledge base according to claim 9 wherein the step of reconfiguring said information into said determined case structure for questionless cases further comprises the step of:

configuring said title portion of each of said computer related topics as a first field of a corresponding questionless case configured in said determined case structure; and configuring said contents portion of each of said computer related topics as a second field of said corresponding questionless case configured in said determined case structure.

11. A method for constructing a questionless case-based knowledge base according to claim 10 and further comprising the step of appending a solution to each of said questionless cases.

12. A method for constructing a questionless case-based knowledge base according to claim 11 wherein the step of appending a solution to each of said questionless cases further comprises the step of forming a path from said third field to said second field for each of said questionless cases.

13. A method for constructing a questionless case-based knowledge base according to claim 12 wherein said computer-related topics are related to a printer for a computer network.

* * * * *